(12) United States Patent
Riedel et al.

(10) Patent No.: US 7,728,715 B2
(45) Date of Patent: Jun. 1, 2010

(54) REMOTE MONITORING

(75) Inventors: Terrance Riedel, Hingham, MA (US); Brendan T. McSheffrey, Newton, MA (US)

(73) Assignee: en-Gauge, Inc., Rockland, MA (US)

( * ) Notice: Subject to any disclaimer, the term of this patent is extended or adjusted under 35 U.S.C. 154(b) by 1149 days.

(21) Appl. No.: 11/071,132

(22) Filed: Mar. 2, 2005

(65) Prior Publication Data

US 2005/0231354 A1 Oct. 20, 2005

Related U.S. Application Data

(63) Continuation-in-part of application No. 10/863,668, filed on Jun. 8, 2004, now Pat. No. 7,271,704, which is a continuation-in-part of application No. 10/614,948, filed on Jul. 8, 2003, and a continuation-in-part of application No. 10/782,288, filed on Feb. 19, 2004, now Pat. No. 7,174,769, said application No. 10/614,948 is a continuation-in-part of application No. 10/274,606, filed on Oct. 21, 2002, now Pat. No. 7,188,679, which is a continuation-in-part of application No. 09/832,531, filed on Apr. 11, 2001, now Pat. No. 6,585,055, which is a continuation-in-part of application No. 09/212,121, filed on Dec. 15, 1998, now Pat. No. 6,302,218, which is a continuation of application No. 08/879,445, filed on Jun. 20, 1997, now Pat. No. 5,848,651, which is a continuation-in-part of application No. 08/590,411, filed on Jan. 23, 1996, now Pat. No. 5,775,430, and a continuation-in-part of application No. PCT/US97/01025, filed on Jan. 23, 1997, now abandoned, said application No. 10/782,288 is a continuation-in-part of application No. 10/274,606, which is a continuation-in-part of application No. 09/832,531, which is a continuation-in-part of application No. 09/212,121, which is a continuation-in-part of application No. 08/879,445, which is a continuation-in-part of application No. 08/590,411, and a continuation-in-part of application No. PCT/US97/01025.

(51) Int. Cl.
*G08B 5/36* (2006.01)

(52) U.S. Cl. ............... 340/286.05; 340/870.02; 340/539.1; 340/539.25; 340/825.36; 340/825.49

(58) Field of Classification Search ........... 340/870.02, 340/506, 520, 521, 539.1, 539.25, 3.1, 825.36, 340/825.49; 348/160; 705/412
See application file for complete search history.

(56) References Cited

U.S. PATENT DOCUMENTS 922,456 A 5/1909 Casey (Continued)

FOREIGN PATENT DOCUMENTS

| DE | 3 731 793 | 3/1989 |
|---|---|---|
| FR | 2 340 109 | 9/1977 |
| FR | 2 515 845 | 5/1983 |
| FR | 2 676 931 | 12/1992 |
| WO | WO-81/02484 | 9/1981 |

(Continued)

OTHER PUBLICATIONS

NFPA 10 Standard for Portable Fire Extinguishers, 1998 Edition; Nat'l Fire Protection Assoc., pp. 10.

(Continued)

*Primary Examiner*—Daryl Pope
(74) *Attorney, Agent, or Firm*—Strategic Patents, P.C.

(57) ABSTRACT

Remote monitoring and inspection of measurement devices, emergency equipment, parking spaces, and other items is accomplished by using a digital image sensor (e.g., a CMOS sensor) to capture a digital image containing information about the monitored item. A signal containing information about the digital image (e.g., data representing the captured digital image or data indicating the state of the captured digital image) is transmitted to a remote central station.

6 Claims, 13 Drawing Sheets

U.S. PATENT DOCUMENTS

| | | |
|---|---|---|
| 2,670,194 A | 2/1954 | Hansson |
| 3,145,375 A | 8/1964 | Webb |
| 3,333,641 A | 8/1967 | Hansom |
| 3,664,430 A | 5/1972 | Sitabklhan |
| 3,735,376 A | 5/1973 | Kermer |
| 3,946,175 A | 3/1976 | Sitabkhan |
| 4,003,048 A | 1/1977 | Weise |
| 4,015,250 A | 3/1977 | Fudge |
| 4,034,697 A | 7/1977 | Russell |
| 4,051,467 A | 9/1977 | Galvin |
| 4,100,537 A | 7/1978 | Carlson |
| 4,101,887 A | 7/1978 | Osborne |
| 4,119,153 A | 10/1978 | Avant |
| 4,125,084 A | 11/1978 | Salmonsen |
| 4,143,545 A | 3/1979 | Sitabkhan |
| 4,184,377 A | 1/1980 | Hubbard |
| 4,246,046 A | 1/1981 | Lameyer |
| 4,279,155 A | 7/1981 | Balkanli |
| 4,289,207 A | 9/1981 | Wernert |
| 4,303,395 A | 12/1981 | Bower |
| 4,342,988 A | 8/1982 | Thompson et al. |
| 4,360,802 A | 11/1982 | Pinto |
| 4,418,336 A | 11/1983 | Taylor |
| 4,419,658 A | 12/1983 | Jarosz |
| 4,531,114 A | 7/1985 | Topol |
| 4,548,274 A | 10/1985 | Simpson |
| 4,586,383 A | 5/1986 | Blomquist |
| 4,599,902 A | 7/1986 | Gray |
| 4,613,851 A | 9/1986 | Hines |
| 4,697,643 A | 10/1987 | Sassier |
| 4,805,448 A | 2/1989 | Armell |
| 4,823,116 A | 4/1989 | Kitchen, III et al. |
| 4,823,788 A | 4/1989 | Smith et al. |
| 4,835,522 A | 5/1989 | Andrejasich et al. |
| 4,866,423 A | 9/1989 | Anderson |
| 4,887,291 A | 12/1989 | Stillwell |
| 4,890,677 A | 1/1990 | Scofield |
| 4,928,255 A | 5/1990 | Brennecke et al. |
| 4,979,572 A | 12/1990 | Mikulec |
| 5,123,409 A | 6/1992 | Sheffield et al. |
| 5,153,567 A | 10/1992 | Chimento |
| 5,153,722 A | 10/1992 | Goedeke et al. |
| 5,224,051 A | 6/1993 | Johnson |
| 5,357,242 A | 10/1994 | Morgano |
| 5,388,570 A | 2/1995 | Wassil |
| 5,400,246 A | 3/1995 | Wilson et al. |
| 5,460,228 A | 10/1995 | Butler |
| 5,475,614 A | 12/1995 | Tofte et al. |
| 5,486,811 A | 1/1996 | Wherle |
| 5,534,851 A | 7/1996 | Russek |
| 5,578,993 A | 11/1996 | Sitabkhan et al. |
| 5,593,426 A | 1/1997 | Morgan et al. |
| 5,596,501 A | 1/1997 | Comer et al. |
| 5,613,778 A | 3/1997 | Lawson |
| 5,652,393 A | 7/1997 | Lawson |
| 5,706,273 A | 1/1998 | Guerreri |
| 5,775,430 A | 7/1998 | McSheffrey |
| 5,781,108 A | 7/1998 | Jacob |
| 5,793,280 A | 8/1998 | Hincher |
| 5,808,541 A | 9/1998 | Golden |
| 5,848,651 A | 12/1998 | McSheffrey |
| 5,853,244 A | 12/1998 | Hoff et al. |
| 5,864,287 A | 1/1999 | Evans |
| 5,877,426 A | 3/1999 | Hay |
| 5,936,531 A | 8/1999 | Powers |
| 5,952,919 A | 9/1999 | Merrill |
| 6,014,307 A | 1/2000 | Crimmins |
| 6,114,823 A | 9/2000 | Doner |
| 6,125,940 A | 10/2000 | Oram |
| 6,128,576 A | 10/2000 | Nishimoto et al. |
| 6,141,584 A | 10/2000 | Rockwell et al. |
| 6,155,160 A | 12/2000 | Hochbrueckner |
| 6,168,563 B1 | 1/2001 | Brown |
| 6,240,365 B1 | 5/2001 | Bunn |
| 6,270,455 B1 | 8/2001 | Brown |
| 6,289,331 B1 | 9/2001 | Pedersen et al. |
| 6,301,501 B1 | 10/2001 | Cronin et al. |
| 6,302,218 B1 | 10/2001 | McSheffrey et al. |
| 6,311,779 B2 | 11/2001 | McSheffrey |
| 6,317,042 B1 | 11/2001 | Engelhorn et al. |
| 6,327,497 B1 | 12/2001 | Kirchgeorg et al. |
| 6,336,362 B1 | 1/2002 | Duenas |
| 6,351,689 B1 | 2/2002 | Carr et al. |
| 6,357,292 B1 | 3/2002 | Schultz et al. |
| 6,401,713 B1 | 6/2002 | Hill et al. |
| 6,450,254 B1 | 9/2002 | Hoyle et al. |
| 6,488,099 B2 | 12/2002 | McSheffrey et al. |
| 6,496,110 B2 | 12/2002 | Peterson et al. |
| 6,542,076 B1 | 4/2003 | Joao |
| 6,585,055 B2 | 7/2003 | McSheffrey et al. |
| 6,587,049 B1 | 7/2003 | Thacker |
| 6,598,454 B2 | 7/2003 | Brazier et al. |
| 6,646,545 B2 | 11/2003 | Bligh |
| 6,735,473 B2 | 5/2004 | Kolder et al. |
| 6,853,309 B1 * | 2/2005 | Schroter ............... 340/870.02 |
| 6,856,251 B1 | 2/2005 | Tietsworth et al. |
| 2001/0052681 A1 | 12/2001 | Deavila |
| 2003/0071736 A1 | 4/2003 | Brazier et al. |
| 2003/0116329 A1 | 6/2003 | McSheffrey |
| 2003/0135324 A1 | 7/2003 | Navab |
| 2003/0189492 A1 | 10/2003 | Harvie |
| 2004/0017471 A1 * | 1/2004 | Suga et al. ............... 348/143 |

FOREIGN PATENT DOCUMENTS

| | | |
|---|---|---|
| WO | WO 81/02484 | 9/1981 |
| WO | WO 94/11853 | 5/1994 |
| WO | WO 01/46780 | 6/2001 |
| WO | WO 01/93220 | 12/2001 |
| WO | WO 03/076765 | 9/2003 |
| WO | WO 03/098908 | 11/2003 |

OTHER PUBLICATIONS

Cole-Parmer Brochure, "Exciting New Products for Measuring Flow and Pressure," Canada, received Apr. 23, 1996, 1 page.

* cited by examiner

REMOTE MONITORING

RELATED APPLICATION INFORMATION

This application is a continuation-in-part of U.S. application Ser. No. 10/863,668, filed Jun. 8, 2004, now U.S. Pat. No. 7,271,704. U.S. application Ser. No. 10/863,668 is a continuation-in-part of U.S. application Ser. No. 10/614,948, filed Jul. 8, 2003, now pending, and U.S. application Ser. No. 10/782,288, filed Feb. 19, 2004, now U.S. Pat. No. 7,174,769 both of which are continuations-in-part of U.S. application Ser. No. 10/274,606, filed Oct. 21, 2002, now U.S. Pat. No. 7,188,679, which is a continuation-in-part of U.S. application Ser. No. 09/832,531, filed Apr. 11, 2001, now U.S. Pat. No. 6,585,055, issued Jul. 1, 2003, which is a continuation-in-part of U.S. application Ser. No. 09/212,121, filed Dec. 15, 1998, now U.S. Pat. No. 6,302,218, issued Oct. 16, 2001, which is a continuation of U.S. application Ser. No. 08/879,445, filed Jun. 20, 1997, now U.S. Pat. No. 5,848,651, issued Dec. 15, 1998, which is a continuation-in-part of U.S. application Ser. No. 08/590,411, filed Jan. 23, 1996, now U.S. Pat. No. 5,775,430, issued Jul. 7, 1998, and a continuation-in-part of International Application No. PCT/US97/01025, with an International Filing Date of Jan. 23, 1997, now abandoned, the complete disclosures of all of which are incorporated herein by reference.

TECHNICAL FIELD

This disclosure relates to remote monitoring of measurement devices, emergency equipment, and other items.

BACKGROUND

Equipment, such as emergency equipment, fuel tanks, pipelines, etc., often includes one or more digital or analog measurement devices (e.g., liquid level indicators, pressure gauges, thermometers, flow meters, etc.) that provide important data about the equipment. It is also often important to ensure that equipment, such as fire extinguishers and other emergency equipment, are in its installed located and access to the equipment is not blocked. When a number of pieces of equipment are distributed across a large area or are located in an inaccessible areas, it becomes difficult to effectively monitor the status of the equipment.

SUMMARY

In one aspect, the invention features an apparatus for remote inspection of a measurement device having a visible display that includes a digital image sensor positioned to face the display of the measurement device and configured to capture a digital image of the display of the measurement device. The apparatus also includes communications circuitry configured to transmit to a remote central station a signal including information about the captured digital image of the display.

Embodiments may include one or more of the following features. The information transmitted to the remote central station may include data representing the captured digital image. The apparatus may also include an image recognition module (e.g., machine vision or optical character recognition software) configured to recognize one of a plurality of predetermined states of the measurement device from the captured digital image. The image recognition module may be configured to recognized one of the plurality of predetermined states prior to transmission of the signal to the remote central station and the information transmitted to the remote central station may include data representing the recognized state.

The communication circuitry may be configured to transmit wireless signals, hardwire signals, or both to the remote central station. The apparatus may also include a network (e.g., a wireless mesh network, IEEE 802.15.4 network, etc.) linking the communication circuitry with the remote central station.

The digital image sensor may be a CMOS (Complementary Metal-Oxide Semiconductor), CCD (Charge Coupled Device), full frame, interline, or linear image sensor. In one particular implementation, the measurement device is a pressure gauge on a fire extinguisher. The digital image sensor may be configured to periodically capture a digital image of the display and/or may be configured to capture a digital image of the display in response to a command from the remote central station.

In another aspect, the invention features an apparatus for detection of presence of an portable item in an installed location. The apparatus includes a digital image sensor positioned to face the portable item in its installed location and configured to capture a digital image of the installed location, and communications circuitry configured to transmit to a remote central station a signal including information about the captured digital image.

Embodiments may include one or more of the following features. The digital image sensor may be configured to periodically capture a digital image of the display and/or capture a digital image in response to a command from the remote central station.

The apparatus may include an image recognition module configured to recognize at least whether the portable item is in its installed position and the signal transmitted to the central station may include data indicating whether the portable item is in its installed position.

The monitored item may be a piece of emergency equipment (e.g., a fire extinguisher, portable defibrillator) or other important equipment. The apparatus may include a network, such as a wireless mesh network, linking the communication circuitry with the remote central station.

In another aspect the invention features an apparatus for detection of presence of an obstruction blocking access to or viewing of an item. The apparatus includes a digital image sensor positioned to face an access area to the item and configured to capture a digital image of the access area and communications circuitry configured to transmit to a remote central station a signal including information about the captured digital image.

Embodiments may include one or more of the following features. The digital image sensor may be configured to periodically capture a digital image of the access area and/or capture a digital image in response to a command from the remote central station The apparatus may include an image recognition module configured to recognize at least whether the access area is obstructed. The signal transmitted to the remote central station may include data indicating whether the access area is obstructed.

The monitored item may be an exit way (e.g., an emergency exit way), a piece of emergency equipment (e.g., fire extinguisher, defibrillator, fire alarm pull station, etc.) or other items such as an automobile in a parking space.

In another aspect, the invention features an apparatus for remotely monitoring an item that includes a digital image sensor positioned to face an access area to the item and configured to capture a digital image of the access area in response to a change in a state of the item and communications circuitry configured to transmit to a remote central station a signal data representing the captured digital image.

In one particular embodiment, the monitored item is a fire alarm pull station and the change in a state of an item comprises an activation of the fire alarm pull station. In other embodiments, the item may be a fire extinguisher or a portable defibrillator and the change in state may be removal of the extinguisher or defibrillator from an installed position. In another particular embodiment, the monitored item is a parking space and the change in state may be presence or removal of an automobile from the parking space.

These or other embodiments may include one or more of the following features. The apparatus may also include a network (e.g., a wireless mesh network) linking the communication circuitry and the remote central station. The apparatus may be configured to transmit data representing the captured digital image to the remote central station automatically or in response to a command received from the remote central station. The apparatus may also include an input for receiving data indicating a change of state of the monitored item.

The details of one or more embodiments of the invention are set forth in the accompanying drawings and the description below. Other features, objects, and advantages of the invention will be apparent from the description and drawings, and from the claims.

DETAILED DESCRIPTION

It is often desirable to remotely monitor digital or analog measurement devices, such as pressure gauges, liquid level indicators, thermometers, voltmeters, flow meters, etc., to ensure proper operation or check the status of important equipment (e.g., a fire extinguisher, portable oxygen tank, pipeline, battery, etc.), or measure usage of a consumable material (e.g., electric, gas, or water meter, liquid level indicator for a home heating oil or liquid propane tank, etc.). Often equipment will include a measurement device that can be viewed on site (e.g., a conventional pressure gauge on a fire extinguisher), but is incapable of transmitting a signal indicating the condition of the measurement device to a remote monitoring device. One way to remote monitoring of such a measurement device is to mount a digital image sensory device, such as a CMOS sensor, and communications circuitry on or near the measurement device. The digital image sensory device can be configured to capture an image of the measurement device at a desired frequency (e.g., every 1 second, 1 minute, 1 hour, 1 day, etc.) and can transmit the captured image to a remote monitoring station, either via wired or wireless transmission. Alternatively, the digital image sensor can include a microprocessor programmed to recognize predetermined conditions of a measurement device and transmit a signal indicating the presence of recognized predetermined conditions to a central station. Similarly, a digital image sensor can be configured to recognize the characters or numbers on the measurement device (e.g., a measurement device having a digital readout), decode them, and transmit a signal containing the decoded values.

Figure 1A:
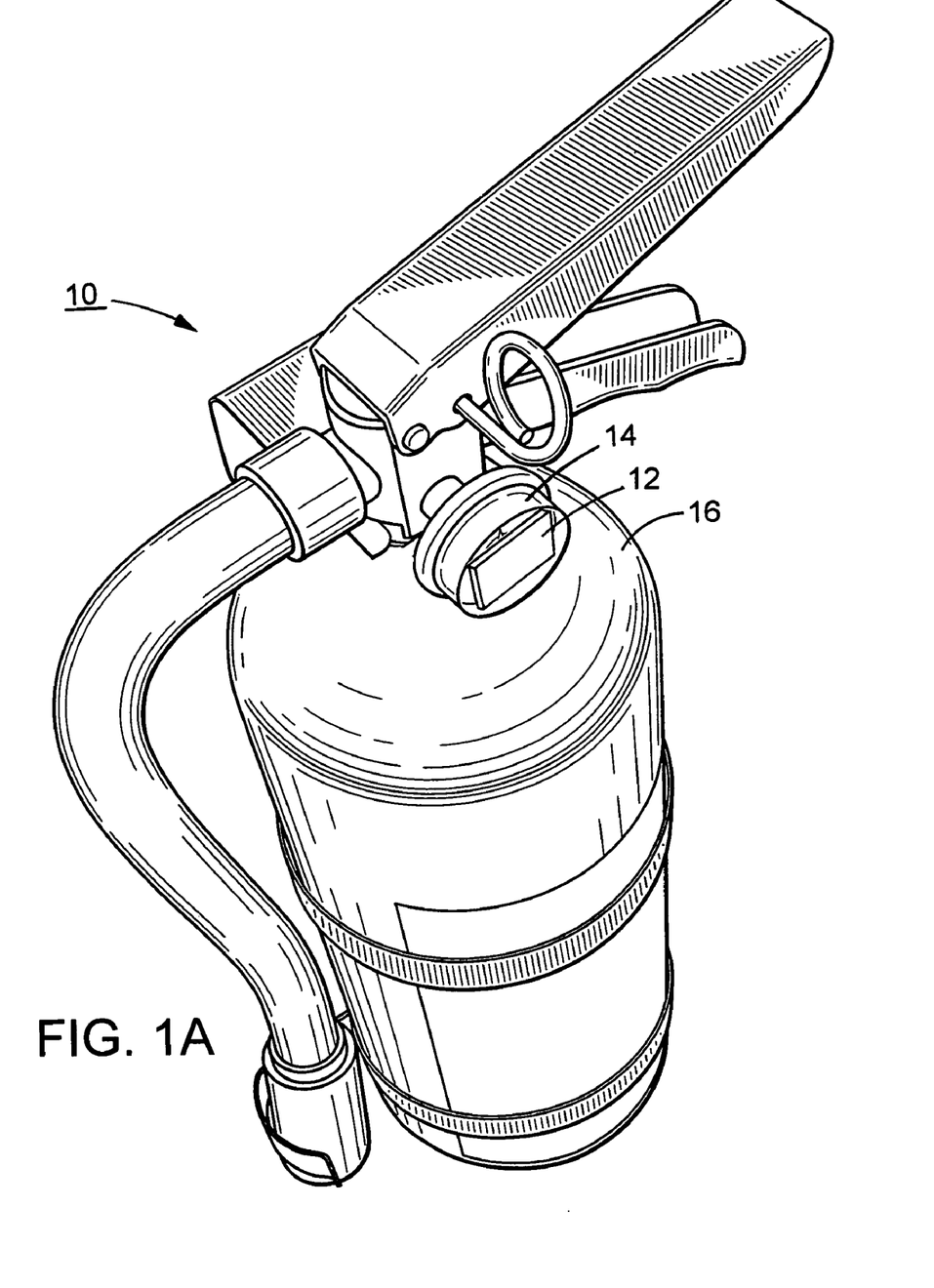
FIGS. 1A-1C are diagrams of a digital image sensory device mounted on a pressure gauge of a fire extinguisher.

For example, as shown in FIG. 1A, a fire extinguisher 10 includes a CMOS sensory device 12 attached to a pressure gauge 14, which monitors pressure of fire suppressant stored within the extinguisher's tank 16. The CMOS sensory device is attached in such a way that the CMOS camera (not shown) has a clear view to the display of the pressure gauge, but does not obstruct a person's view of the pressure gauge.

Figure 1B:
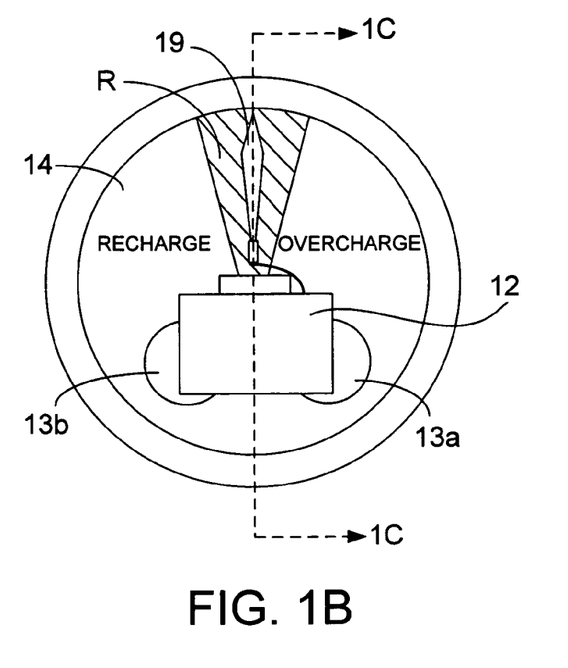
Figure 1C:
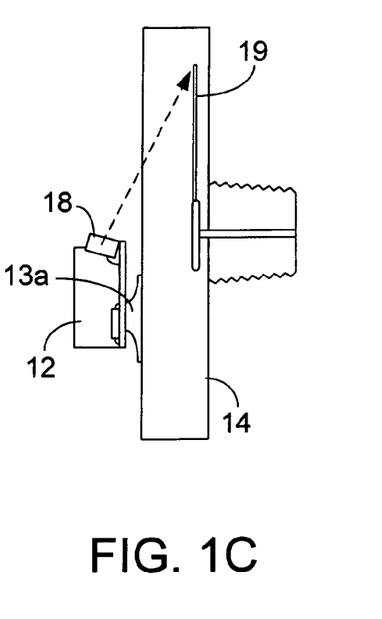

Referring to FIGS. 1B-1C, the CMOS sensory device 12 is releasably attached to the pressure gauge with a pair of suction cups 13a, 13b. In other implementations, the CMOS sensory device may be integral with the pressure gauge or attached to the pressure gauge with straps, clips, adhesive, screws, bolts, or other known releasable or non-releasable attachment devices.

The CMOS sensory device includes a CMOS camera 18 that is positioned to view a portion of the pressure gauge display that shows whether the indicator needle 19 is within a predetermined pressure range (shaded region R).

Figure 2:
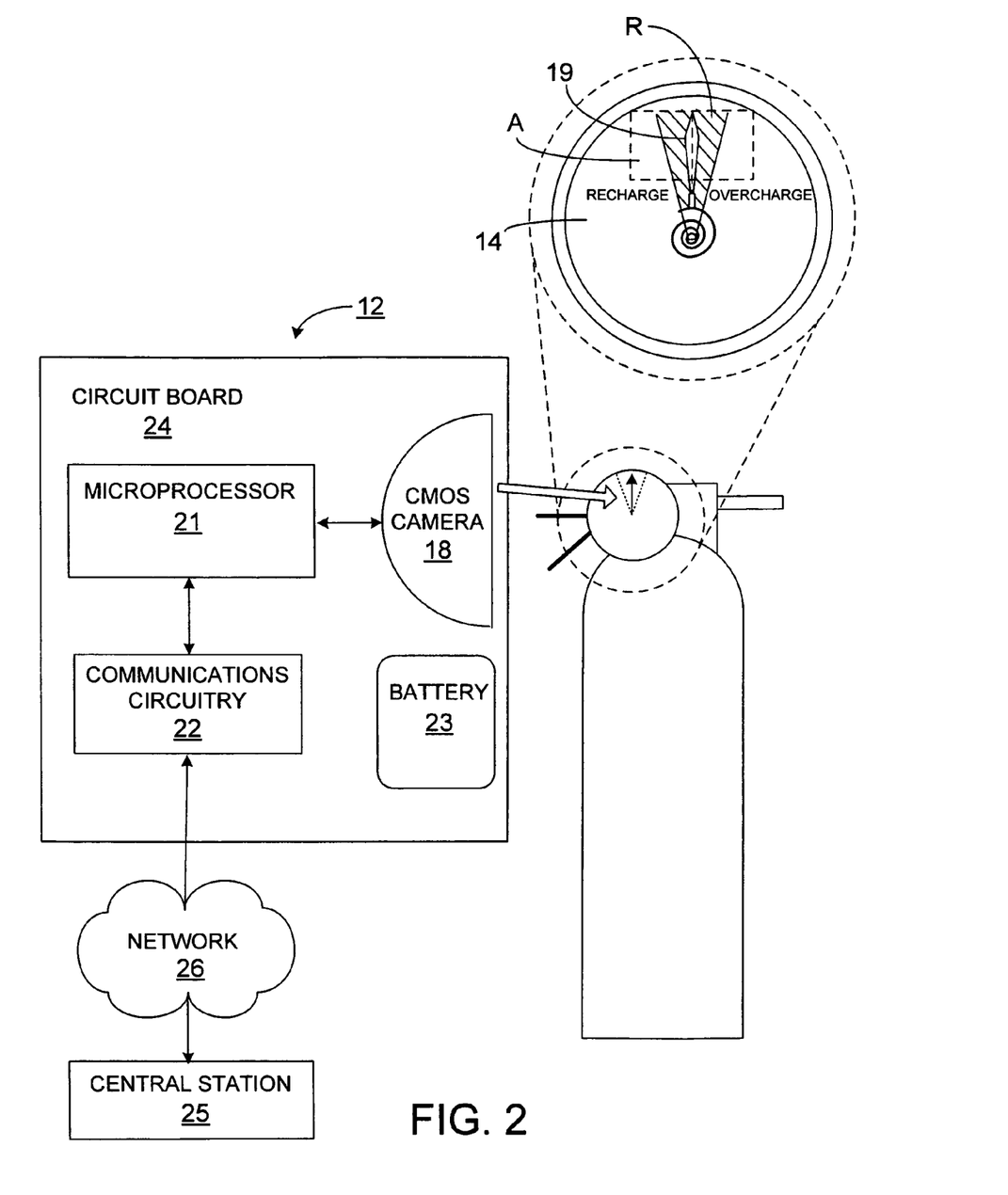
FIG. 2 is a diagram of a digital image sensory device in communication with a remote central station using a network.

Referring to FIG. 2, the CMOS sensory device 12 includes a CMOS camera 18, microprocessor 21, communications circuitry and antenna 22, and battery 23 all mounted to a circuit board 24. The CMOS camera 18 is positioned to capture images of area A on the pressure gauge, which displays whether the indicator needle 19 is within the desired pressure range (e.g., shaded region R) or outside the desired pressure range. Battery 23 supplies power to the CMOS camera and other components on circuit board 24. Communications circuitry 22 provides two-way communication between the CMOS sensory device 12 and a remote central station 25 using a network 26 (e.g., a wireless IEEE 802.15.4-compliant or IEEE 802.11-compliant wireless network, Ethernet network, etc.). Microprocessor 21 controls operation of the CMOS sensory device by triggering the CMOS camera to periodically capture a digital image of area A on the pressure gauge. In some implementations, microprocessor 21 can be configured to "recognize" a state of the digital image and transmit a signal to the remote central station indicating the recognized state In the illustrated example, the fire extinguisher's pressure gauge has at least two important states: (i) a normal state when the pressure gauge indicates a pressure within the operating limits and a (ii) an out-of-range state when the pressure gauge indicates a pressure outside the operating limits. Other implementations may recognize other states, such as a normal state, an above-normal state and a below-normal state. In some implementations, a digital image sensory device is configured to recognize alpha-numeric characters displayed by a measurement device. For example, if a measurement device has a digital readout, a digital image sensory device may execute optical character recognition (OCR) software to recognize the alpha-numeric characters captured in the digital image.

The components of CMOS sensory device 12 shown in FIG. 2 are logical components, and, in actual implementations, one logical component may be implemented in separate physical component. Similarly, the functionality of multiple logical components may be combined and implemented as a single physical component. For example, a digital image sensory device may be actually implemented with multiple processors, e.g., one processor dedicated for the operation of the digital image sensor and a second processor dedicated to recognizing states and/or alpha-numeric characters captured in a digital image. Similarly, the functionality of communication circuitry and a microprocessor may be combined into a single physical component.

Figure 3:
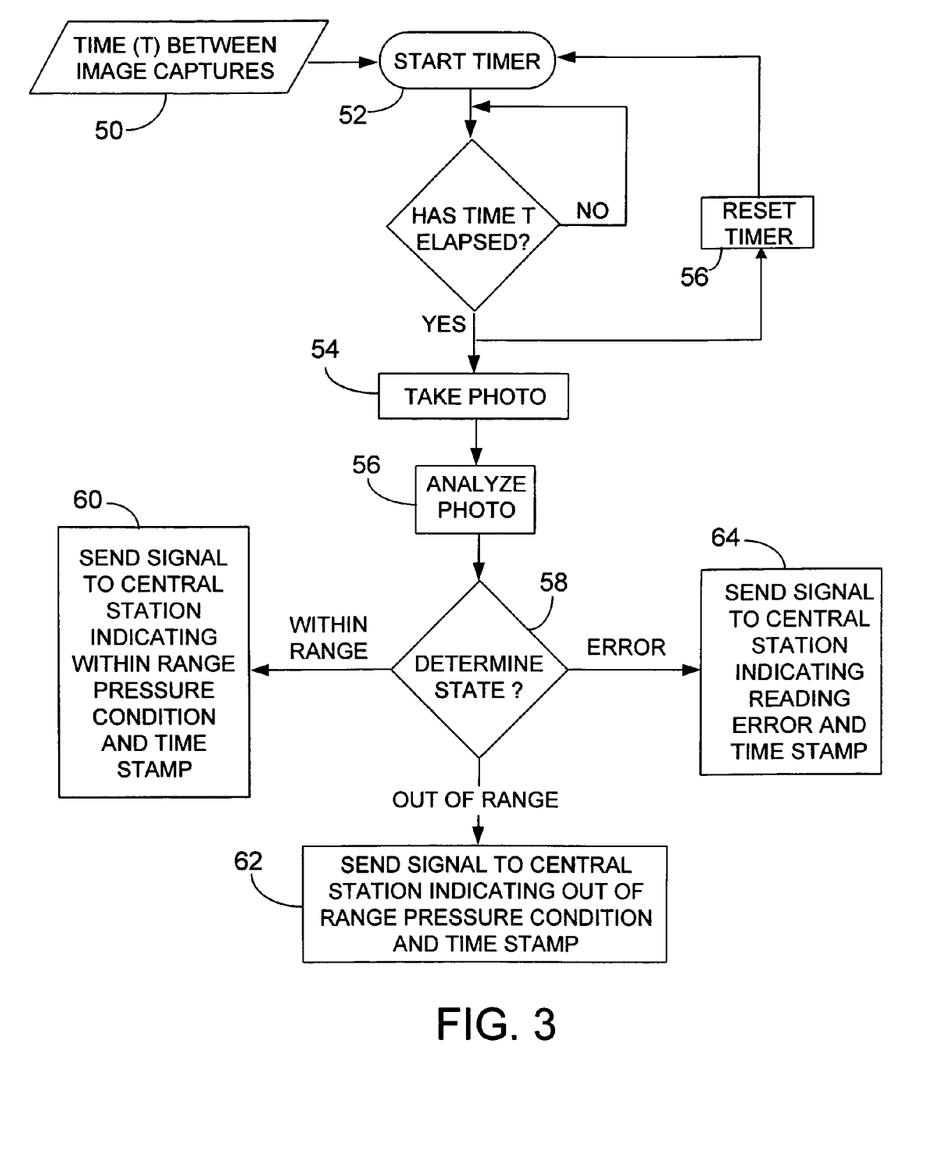
FIGS. 3 and 5 are flow charts illustrating operation of digital image sensory devices.

Referring to FIG. 3, a digital image sensory device, such as CMOS sensory device 12 shown in FIGS. 1-2, receives as input a time interval T (50) between image captures. In some implementations, the time interval may be preprogrammed and not variable by a user, while in other implementations the time interval may be programmed by a user using, for example, a program code contained in a separate microprocessor or on a microprocessor associated with wireless transmission circuitry.

Operation begins by starting (52) a timer and waiting until the timer reaches time T. When the timer reaches time T, the CMOS sensory device uses a CMOS camera to capture (54) an image of the measurement device. In addition, the timer is reset (56) and re-started (52) for the next image capture.

After the CMOS camera has captured an image of the measurement device, the CMOS sensory device analyzes (56) the captured image to determine (58) a state of the measurement device. In this example, the CMOS sensory devices analyzes the captured image to determine which of two states the image presents: (i) a "normal" state in which the image shows the measurement device to be within a predetermined pressure range, or (ii) an "out-of-range" state in which the image shown the measurement device to be outside a predetermined pressure range. The CMOS sensory device can use any known image recognition software, such as optical character recognition (OCR) or machine vision software, for determining the state of the measurement device shown in the image. If the CMOS sensory device cannot determine with a sufficient level of confidence (e.g., 90%) the state of the measurement device shown in the image, the CMOS sensory device reverts to an "error" state. In some implementations, a digital image sensory device may be programmed to capture and attempt to recognize another digital image, or, alternative, transmit the unrecognizable image back to the remote central station, if the digital image sensory device reverts to an error state.

If the CMOS sensory device determines from the digital image that the measurement device is within the predetermined pressure range (i.e., in the normal state), it transmits (60) a signal to a remote central station indicating that the measurement device is within the predetermined pressure range along with a time stamp of when the digital image was captured and an identification code associated with the CMOS sensory device. If the CMOS sensory device determines from the digital image that the measurement device is out of the predetermined pressure range (i.e., in the out-of-range state), then it transmits (62) a signal to the remote central station indicating that the measurement device is out of the predetermined pressure range, along with a time stamp of when the digital image was captured and the CMOS sensory device's identification code. Similarly, if the CMOS sensory device cannot determine from the digital image whether the measurement device is within or out of the predetermined pressure range (i.e., in the error state), transmits (64) a signal to the remote central station indicating an error, along with a time stamp of when the digital image was captured and the CMOS sensory device's identification code.

Figure 4:
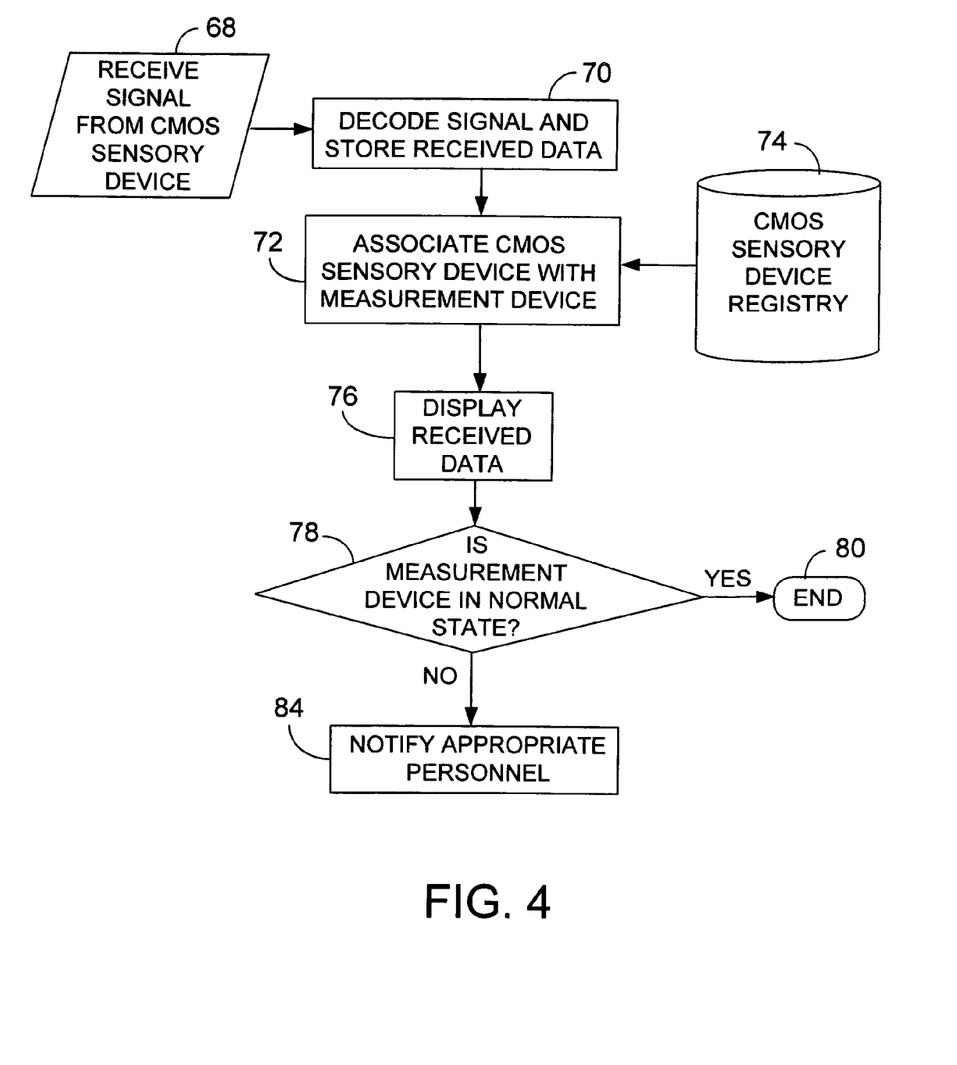
FIG. 4 is a flow chart illustrated operation of a remote central station.

When a signal is received at the remote central station, the central station decodes and stores the transmitted information and automatically notifies appropriate personnel (e.g., fire department, police department, building management department, etc.) of abnormal conditions. For example, as shown in FIG. 4, a remote central station receives (68) a signal from one of several CMOS sensory devices distributed throughout a room, building, group of buildings, or other geographic area. The signal preferably includes information about the state of the monitored measurement device determined from a captured digital image of the device, the time at which the digital image was captured, and a unique identification code of the CMOS sensory device. The remote central station decodes and stores (70) the received sensory data in a data base, data table or similar data structure. The remote central station also accesses a registry (74) of CMOS sensory devices, which matches each CMOS sensory device by its unique identification code. The remote central station accesses the registry of CMOS sensory device to associate (72) the received signal with its corresponding measurement device. For example, a CMOS sensory device having unique ID code "123" may be attached to a pressure gauge on a fire extinguisher located on the second floor, room 205 of a particular building. The CMOS registry includes, for example, a table that associates the unique ID code "123" with the type (fire extinguisher pressure gauge) and location (second floor, room 205) of the corresponding measurement device.

The remote central station also displays the received data on a display device. In some implementations, the received data is overlaid on a graphical map of the building, floor, campus, etc. that is being monitored. To allow a user to more quickly determine the status of an array of distributed measurement devices monitored by CMOS sensory devices, the remote central station may display color codes (e.g., red for a current abnormal reading, green for a current normal reading, and yellow for a current error or warning reading) on the graphical map at the locations where the measurement devices are located or installed. In some implementations, the central station employs a glanceable display device, such as an Ambient Orb™ or Ambient Dashboard™ by Ambient Devices (www.ambientdevices.com). A glanceable device is a device, such as a light source, meter, or sound source, which communicates information without demanding a user's attention. For example, status information on monitored measurement devices could be processed for output to a glanceable display such that monitored devices at a location (e.g., in a room, on a floor, in a building, etc.) or of a particular type (e.g., fire extinguisher pressure gauges, portable oxygen tank pressure gauges, etc.) causes a light to glow more green in color as the more devices show a normal status and glow more red in color as they show a non-normal status (e.g., abnormal or error). Similarly, sensory data indicating a normal status of monitored measurement devices may cause a needle to move towards one end of a scale whereas as monitored devices show a abnormal status the needles moves towards an opposite end of the scale. In this way, sensory data collected from many measurement devices can be analyzed in the aggregate in a simple, easy-to-view format.

It may be desirable for a user at a remote central station to download captured images for inspection. For example, if a CMOS sensory device transmits a signal indicating an out-of-range pressure condition or an error condition, an operator at the remote central station may want to view the captured image to verify the reading or to see if the human operator can read the captured image. Similarly, an operator may want to periodically test operation of the system by comparing captured images with the state indicated by the CMOS sensory device. Accordingly, in some implementations, a CMOS sensory device also includes on-board memory for storing one or more captured digital images and is adapted to respond to requests from a remote central station to upload one or more of the images stored in the memory to the central station. As the CMOS sensory device captures a new image, it overwrites the oldest image stored in its memory. If a user at a remote central station wants to view one or more of the images stored at the CMOS sensory device, the user is able to send a command to the CMOS sensory device instructing it to send one or more of the stored images. In some implementations, the CMOS sensory device may also be equipped to receive a command from a remote user instructing the CMOS sensory device to immediately capture and analyze a monitored measurement device. Thus, a remote user is able to check on the status of a monitored measurement device without having to wait for the next time at which the CMOS sensory device is programmed to capture a digital image.

Figure 5:
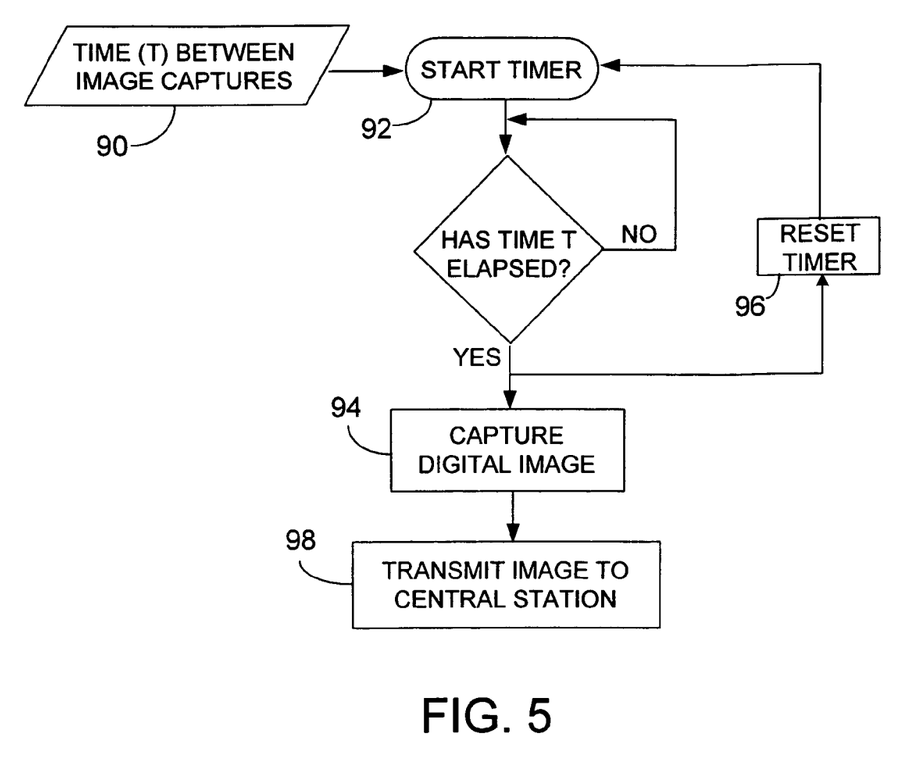

In some implementations, the CMOS sensory device does not include any image recognition software for determining the state of the measurement device as shown in a captured digital image. For example, as shown in FIG. 5, a CMOS sensory device is configured to capture a digital image of a measurement device every T time interval (90-96), and, then transmits (98) the captured digital image directly to the remote central station along with a time stamp and an identification code associated with the CMOS sensory device. Image recognition software may be employed at the remote central station to analyze the incoming images to determine a state of a measurement device shown in the image. Alternatively, the remote central station may not include any image recognition software, but may simply store and/or display captured images for review by a user.

Figure 6:
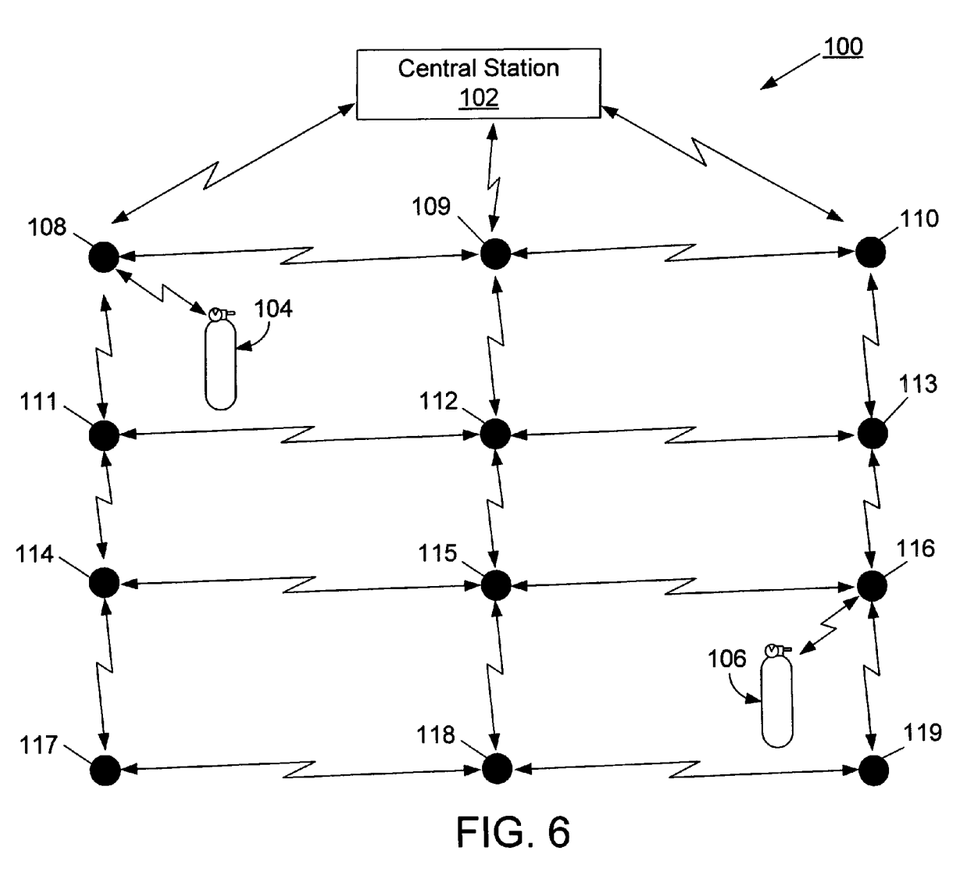
FIG. 6 is a diagram of multiple digital image sensory devices in communication with a central station using a mesh network.

Referring to FIG. 6, a wireless mesh network 100, such as a Zigbee™ wireless mesh network or other IEEE 802.15.4-compliant wireless mesh network, is used to transmit information between a remote central station 102 and remote CMOS sensory devices (not shown) mounted to portable oxygen tanks 104, 106 used, for example, at a hospital, nursing home, or other healthcare facility. The wireless mesh network includes several nodes 108-119, which exchange wireless signals between CMOS sensory devices located within the mesh network and a remote central station 102. In some implementations, the remote central station may include one or more devices for transmitting sensory data to another device (e.g., a server computer) located outside the wireless mesh network. For example, the remote central station may be equipped with a cellular modem, satellite modem, public switched telephone network (PSTN) modem, and/or networking card transmitting data to a remote server. The remote central station may also be equipped to receive and execute commands from a remote device (e.g., a command to have one or more CMOS sensory devices capture and analyze a digital image of a measurement device. The remote central station may be implemented, for example, as a laptop computer, desktop computer, or a single-board computer (e.g., cellular telephone, PDA, etc.).

In some implementations, other types of communication networks than a wireless mesh network are used to exchange. For example, a Bluetooth-compliant wireless network or other IEEE 802.11-compliant wireless network or a hardwire network, such as an Ethernet network, may be used to exchange information between CMOS sensory device and a remote central station.

In addition to using digital image sensory devices to remotely monitor measurement devices (e.g., pressure gauges, fuel level indicators, thermometers, flow meters, etc.), digital image sensors can be used to detect presence of important equipment, such as a portable fire extinguisher or portable defibrillator, at a predetermined location. In addition, digital image sensors can be used to detect presence of an obstruction blocking access to important equipment, such as a fire extinguisher, emergency exit, fire alarm pull station, defibrillator, etc.

Figure 7:
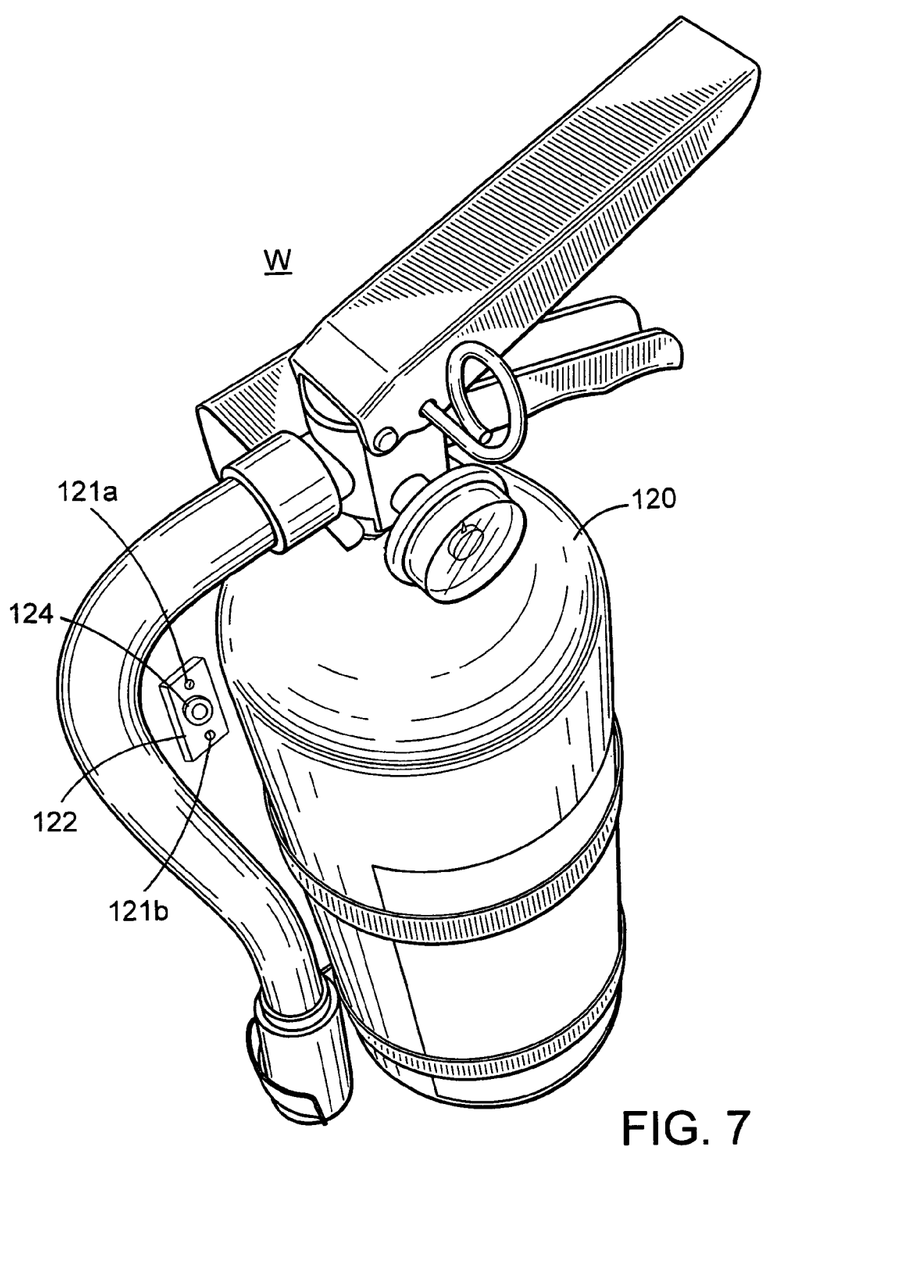
FIGS. 7-9 and 11-12 are diagrams of digital image sensory devices configured to monitor various emergency equipment.

For example, as shown in FIG. 7, a fire extinguisher 120 is mounted to a wall, post, or other support surface, W. A CMOS sensory device 122 is mounted on the wall behind the fire extinguisher 120 with two screws 121a, 121b. The CMOS sensory device includes a CMOS camera 122 and houses components shown in FIG. 2, including a microprocessor, communications circuit, and battery mounted to a circuit board. The CMOS camera is positioned to face the fire extinguisher, and, is configured to periodically capture a digital image of the fire extinguisher at its installed position. By periodically capturing digital images of the fire extinguisher in its installed position, the CMOS sensory device can detect presence (or lack thereof) of the fire extinguisher at its installed location.

In some implementations, the CMOS sensory device includes optical recognition software that recognizes a state of a captured digital image (e.g., installed position state, missing from position state) and transmits a signal indicating the determined state to a remote central station. As described above, the CMOS sensory device in some implementations also includes on-board memory for storing one or more captured digital images and is adapted to respond to requests from a remote central station to upload one or more of the images stored in the on-board memory to the central station. Similarly, in some implementations, the CMOS sensory device may also be equipped to receive a command from a remote user instructing the CMOS sensory device to immediately capture and analyze a monitored measurement device.

Rather than transmitting a status of a captured digital image, the CMOS sensory device may be configured to transmit the digital image to the remote central station, where it may be displayed for a human to analyze, analyzed by image recognition software, or send to another location (e.g., a network server accessible over a public or private network) for display or analysis.

Figure 8:
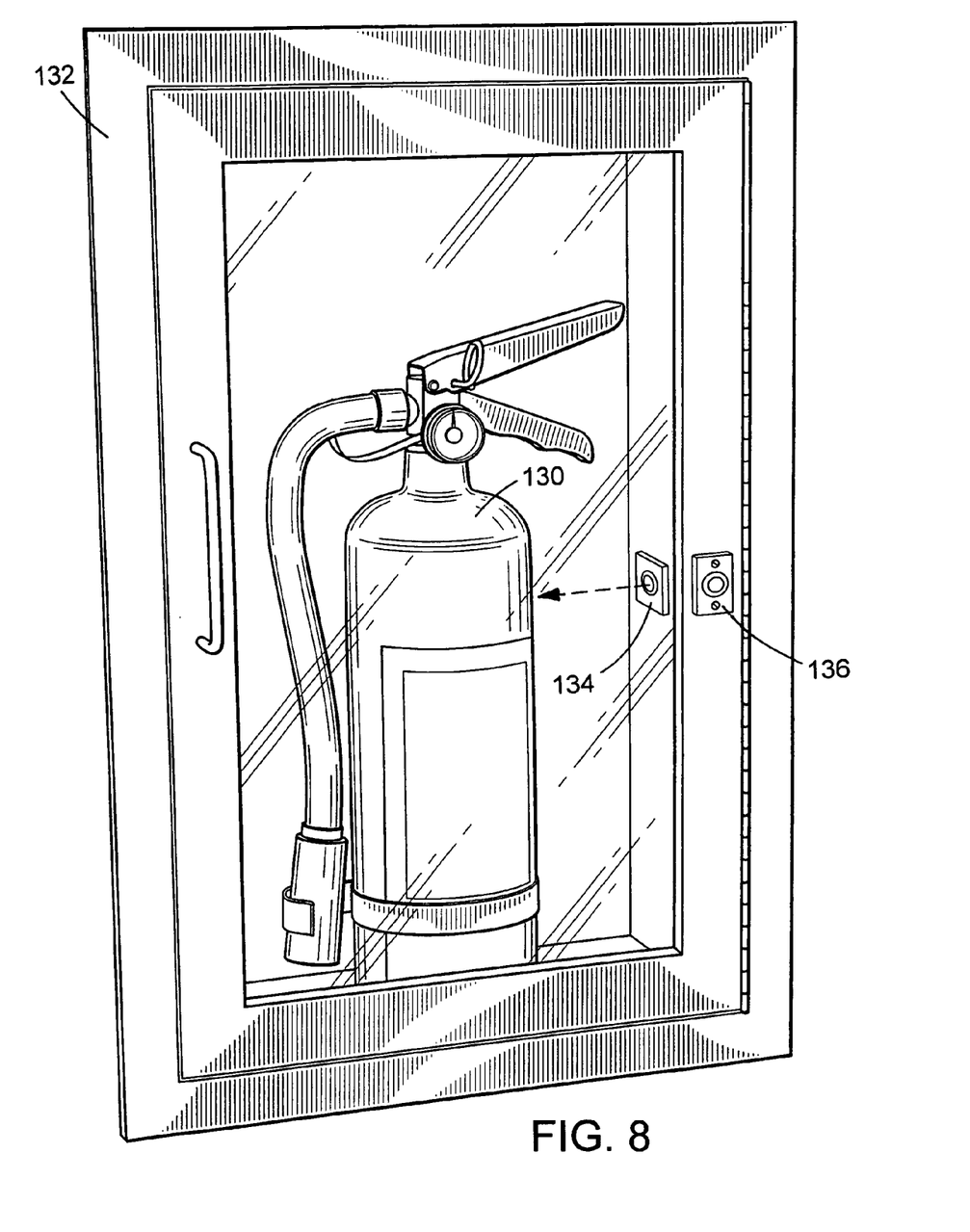
Figure 9:
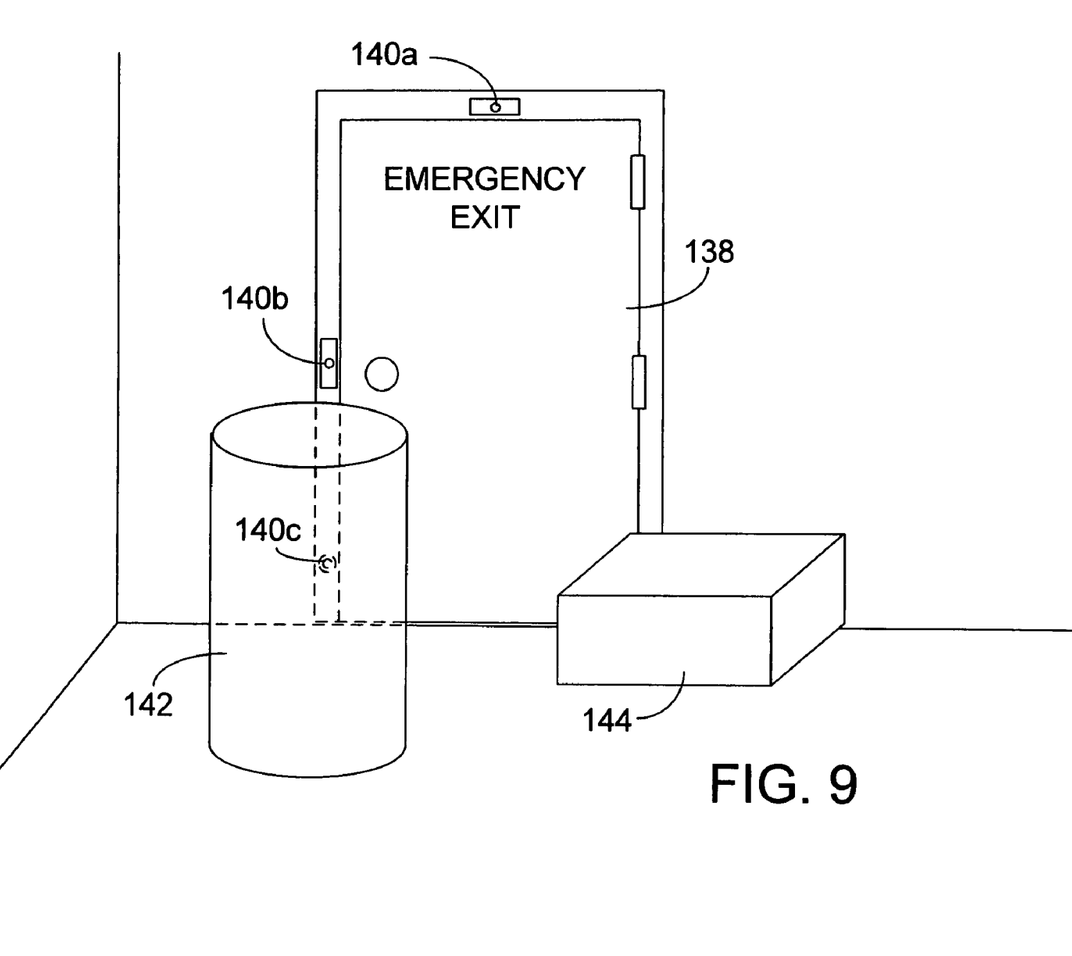

As mentioned above, a digital image sensory device may also be used to detect obstructions to viewing of or obstruction to important equipment, such as emergency equipment. For example, as shown in FIG. 8, a cabinet 132 housing a fire extinguisher 130 includes two CMOS sensors 134, 136. The CMOS camera of CMOS sensor 134 faces the installed position of the fire extinguisher and, therefore, detects when the fire extinguisher is removed from its installed position. The CMOS camera of CMOS sensor 136 faces outward and periodically captures digital images of an access area immediately in front of the cabinet to detect when an object is blocking access to the cabinet. Similarly, as shown in FIG. 9, an emergency exit door includes several CMOS sensors 140a-140c with CMOS cameras that periodically capture images of areas in front of the door to detect presence of obstructions 142, 144 to the emergency exit door. Addition CMOS sensory devices may be placed on the other side of the door 138 to detect presence of obstructions on the opposite side of the door. The CMOS sensory device may be configured to transmit captured digital images to a remote central station via a wireless or hardwired network or may include image recognition software to determine a state of the captured digital image (e.g., no obstruction state, obstructed state, reading error) and transmit a signal indicated the detected state to the remote central station.

CMOS sensory devices can be used presence of any item in a predetermined position such as a portable defibrillator, life jackets/preservers, wheeled fire extinguisher, or an automobile in a parking space. Similarly, CMOS sensory devices can be used to detect obstruction to any item or object in which viewing and/or physical access is important (e.g., fire alarm pull stations, emergency lighting, defibrillators, emergency stairways and exitways, fire hose reels, fire enunciator panels, loading docks, or fire lanes.

Figure 10:
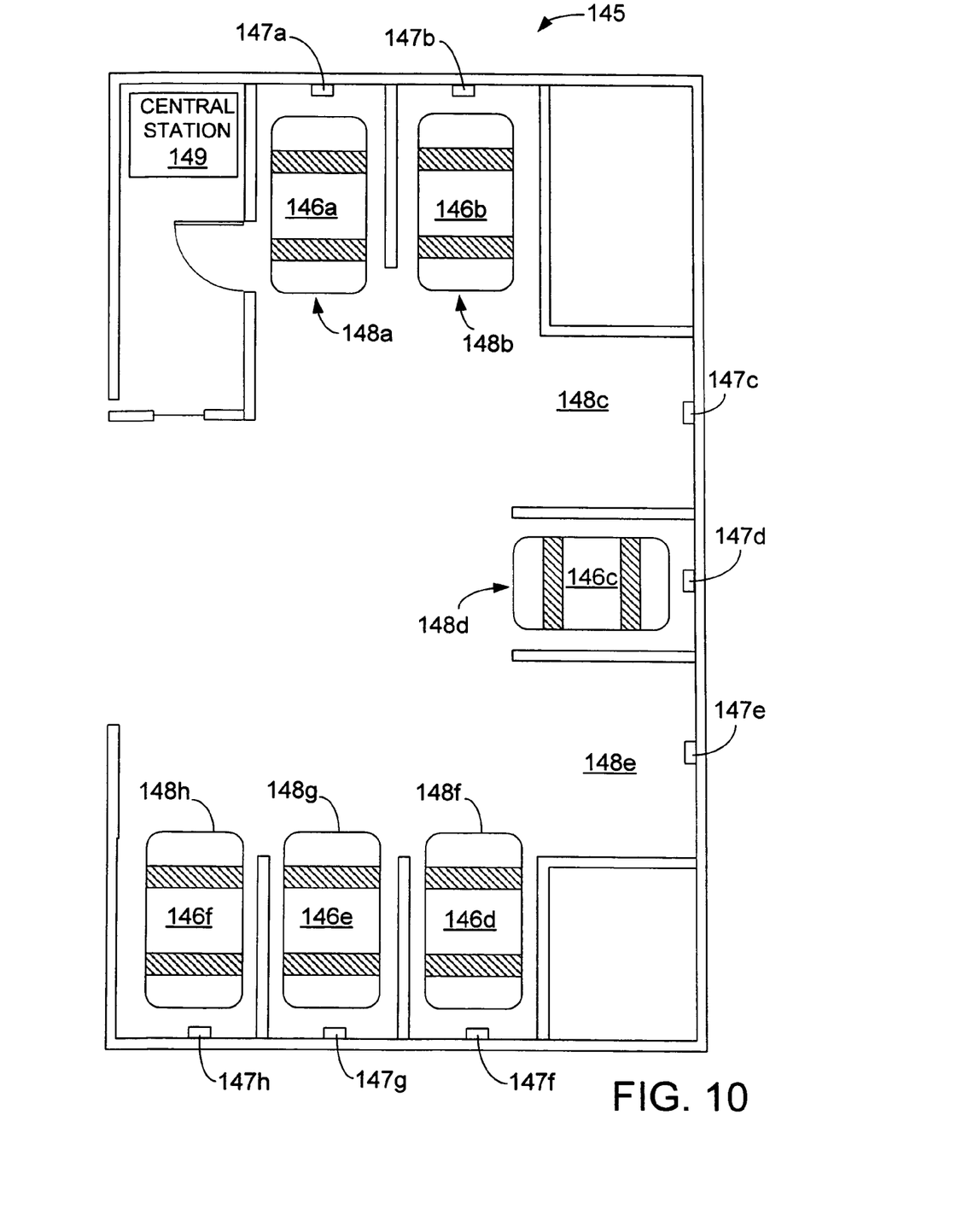
FIG. 10 is a diagram of a digital image sensory device configured to monitor parking spaces in a parking facility.

As shown in FIG. 10, a system 145 for monitoring status of vehicles 146a-146f parked in a parking facility includes a several digital image sensory devices 147a-147h that each face a parking space 148a-148h. The digital sensory devices are in communication with a remote central station 149 over a wireless network (not shown) such as a Zigbee™ wireless mesh network. Each digital image sensory device is programmed to periodically (e.g., every 5 seconds) to capture a digital image of the parking space, determine the state of the space (e.g., empty or occupied), and transmit to a central station a signal identifying the digital image sensory device and the determined state of the space. At the central station 149, signals from each of the digital sensory devices are received and assimilated to determine capacity of the parking facility. In the illustrated example, a worker could view a display on the remote central station and direct an entering customer to the location of one of the two open spaces (i.e., space 148c and 148e) in the facility. In some implementations, the digital image sensory devices may transmit the digital image to the central station where it is analyzed (either by software or by human) to determined the state of the parking space.

Figure 11:
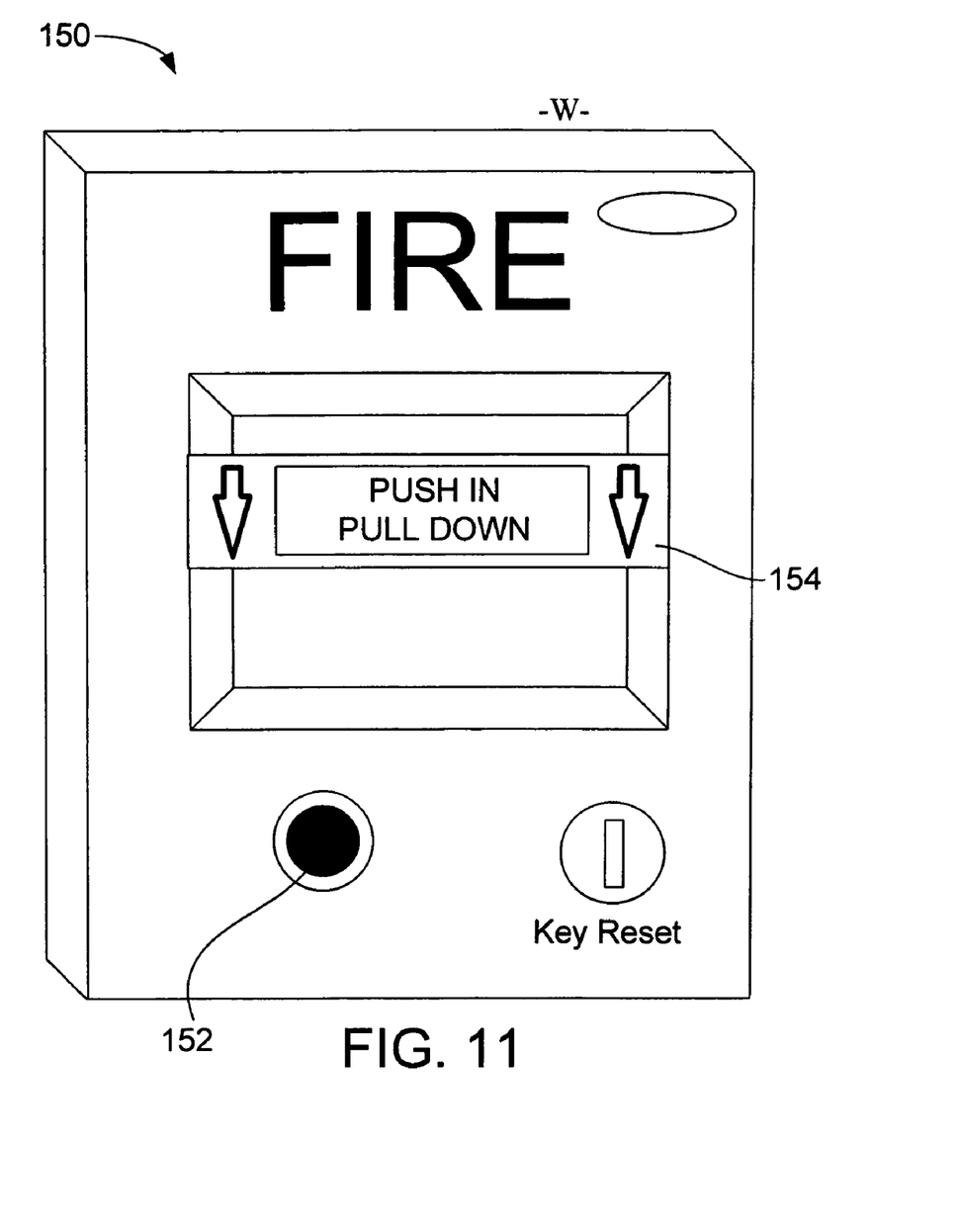

In some implementations, a digital image sensory device is used to capture images of the area around a piece of portable equipment when the equipment is moved from its installed position to identify a person who removed the equipment, and, deter theft or improper use of the equipment. For example, as shown in FIG. 11, a fire alarm pull station 150 is mounted to a wall W or other structure. The fire alarm pull station 150 includes a build-in CMOS sensory device 152, in which a CMOS camera faces an area in front of the pull station. The CMOS sensory device is configured to capture one or more digital images and store when the fire alarm pull station is activated (i.e., the handle 154 is pulled down). The CMOS sensory device either stores the captured digital image for later retrieval or automatically transmits the captured image to the remote central station. Because the intent of the captured digital images immediately following activation of the pull station is to determine the identify of the person who pulled the handle, the CMOS sensory device need not apply image recognition software to determine a state of the image. However, in some implementations, the CMOS sensory device may periodically capture digital images of the area in front of the pull station in order to detect presence of an obstruction. For these digital images, the CMOS sensory device may apply image recognition software to determine a state of the pull station (e.g., pull station obstructed, pull station not obstructed, recognition error).

Figure 12:
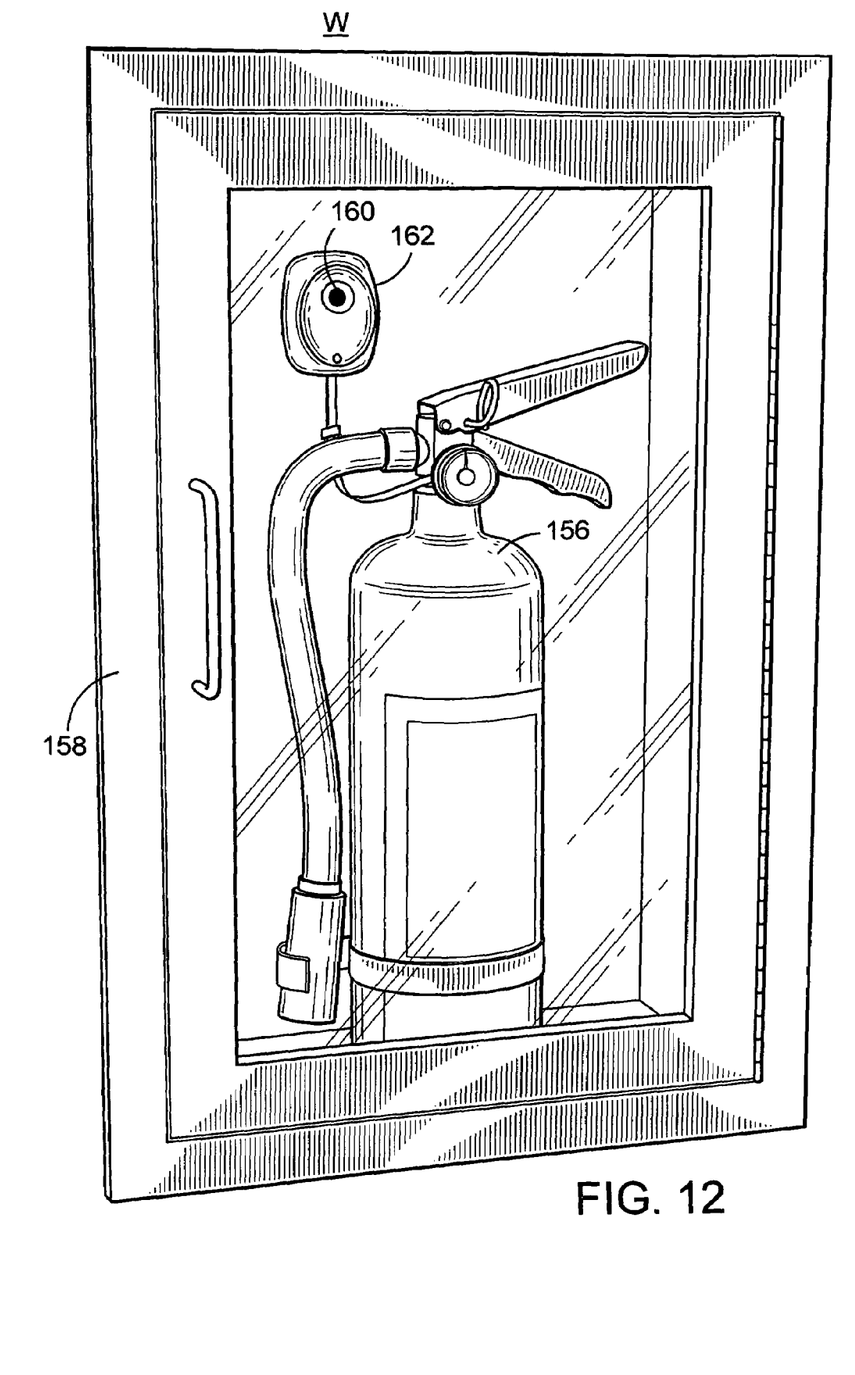

Similarly, as shown in FIG. 12, a fire extinguisher 156 is installed in a cabinet 158 mounted within a wall W. A CMOS sensory device 160 is built into a housing 162. The CMOS sensory device includes a CMOS camera positioned to face an area outside the cabinet at between 4 and 7 feet off the ground (the approximate height of a person's head). A tether 164 is attached between the fire extinguisher 156 and the housing 162 to detect removal of the fire extinguisher from its installed position. U.S. Pat. Nos. 5,484,651, 6,302,218, 6,585,055 and 6,488,099, each of which are incorporated herein by reference, describes examples of tethers used to detect removal of equipment from an installed position. Upon detection of removal of fire extinguisher 156 from its installed position, the CMOS sensory device 160 is configured to capture one or more digital images of the area in front of the cabinet. The CMOS sensory device can be configured to store the digital image(s) for later retrieval and/or automatically transmit captured images to a remote central station, where they may be analyzed to determine the identity of the person that removed the extinguisher.

A number of embodiments of the invention have been described. Nevertheless, it will be understood that various modifications may be made without departing from the spirit and scope of the invention. For example, while a CMOS camera has been illustrated and described as part of the digital image sensor, other digital image capturing devices such as CCD (Charge Coupled Device), full frame, interline, or linear image sensor may be used. Accordingly, other embodiments are within the scope of the following claims.

What is claimed is:

1. Apparatus for detection of presence of an obstruction blocking access to or viewing of an item, the apparatus comprising:
   a digital image sensor positioned to face an access area to the item and configured to capture a digital image of the access area;
   an image recognition module configured to recognize at least whether the access area is obstructed, thereby providing an obstructed state; and
   communications circuitry configured to transmit to a remote central station a signal including information indicative of the obstructed state of the item provided by the captured digital image.

2. The apparatus of claim 1 wherein the digital image sensor is configured to periodically capture a digital image of the access area.

3. The apparatus of claim 1 wherein the signal including information about the captured digital image comprises data indicating whether the access area is obstructed.

4. The apparatus of claim 1 wherein the item is an exit way.

5. The apparatus of claim 1 wherein the item is a piece of emergency equipment.

6. The apparatus of claim 1 wherein the item is an automobile in a parking space.

* * * * *